United States Patent [19]

Adamson et al.

[11] Patent Number: 5,578,145
[45] Date of Patent: Nov. 26, 1996

[54] PROCESS FOR IMPROVING CORROSION RESISTANCE OF ZIRCONIUM OR ZIRCONIUM ALLOY BARRIER CLADDING

[75] Inventors: Ronald B. Adamson, Fremont; Daniel R. Lutz, San Jose, both of Calif.

[73] Assignee: General Electric Company, San Jose, Calif.

[21] Appl. No.: 368,832

[22] Filed: Dec. 14, 1994

Related U.S. Application Data

[62] Division of Ser. No. 142,034, Oct. 28, 1993, Pat. No. 5,417,780.

[51] Int. Cl.$^6$ .............................. C22C 14/00; G21C 3/00
[52] U.S. Cl. ....................... 148/421; 376/416; 428/610; 428/660
[58] Field of Search ........................ 148/421; 420/422; 376/416; 428/610, 660

[56] References Cited

U.S. PATENT DOCUMENTS

| | | | |
|---|---|---|---|
| 4,200,492 | 4/1980 | Armijo et al. | 176/82 |
| 4,390,497 | 6/1983 | Rosenbaum et al. | |
| 4,576,654 | 3/1986 | Eddens et al. | 148/407 |
| 4,664,727 | 5/1987 | Inagaki et al. | 148/407 |
| 4,718,949 | 1/1988 | Takase et al. | |
| 4,863,679 | 9/1989 | Imahashi et al. | 376/417 |
| 4,938,921 | 7/1990 | Mardon et al. | 376/457 |
| 4,963,316 | 10/1990 | Stehle et al. | 376/416 |
| 5,125,985 | 6/1992 | Foster et al. | 148/672 |
| 5,194,101 | 3/1993 | Worcester et al. | 148/671 |
| 5,247,550 | 9/1993 | Perkins et al. | 376/416 |
| 5,296,058 | 3/1994 | Steinberg | 148/672 |

FOREIGN PATENT DOCUMENTS

| | | |
|---|---|---|
| 0195154 | 9/1985 | European Pat. Off. . |
| 0562404 | 3/1993 | European Pat. Off. . |

OTHER PUBLICATIONS

Zirconium in the Nuclear Industry: 7th International Symposium, –Strasbourg France –24/27 Jun. 1985 –ASTM STP 939 (1987), pp. 387 –416, Cheng et al., "Mechanical Studies of Zircaloy nodular corrosion" p. 400, left col., paragraph 1 –right col., last paragraph.

B. Cheng and R. B. Adamson, "Mechanistic Studies of Zircaloy Nodular Corrosion", ASTM STP939, 1987.

Baily et al., "Recent GE BWR Fuel Experience", Avignon, France, 1991.

Rosenbaum et al., "Zirconium –Barrier Cladding Attributes", ASTM STP 939, 1987.

*Primary Examiner*—John Sheehan
*Attorney, Agent, or Firm*—James E. McGinness; Jeffrey K. Weaver

[57] ABSTRACT

A method for fabricating a composite cladding comprised of a moderate-purity metal barrier of zirconium metallurgically bonded on the inside surface of a zirconium alloy tube which improves corrosion resistance. The improved corrosion resistance of the liner is accomplished by suitable heat treatment of the Zircaloy-zirconium composite cladding to allow diffusion of alloying elements, notably Fe and Ni, from the Zircaloy into the zirconium, in particular, to the inner surface of the zirconium liner. This diffusion anneal reduces the undesirable tendency of zirconium liner to oxidize rapidly.

4 Claims, 2 Drawing Sheets

PROCESS FOR IMPROVING CORROSION RESISTANCE OF ZIRCONIUM OR ZIRCONIUM ALLOY BARRIER CLADDING

This is a divisional of application Ser. No. 08/142,034, filed on Oct. 28, 1993, now U.S. Pat. No. 5,417,780.

FIELD OF THE INVENTION

This invention generally relates to nuclear fuel elements for use in the core of nuclear fission reactors. In particular, the invention relates to an improved nuclear fuel element having a composite cladding comprised of a metal barrier of sponge zirconium, crystal bar zirconium or dilute zirconium alloy bonded to the inside surface of a zirconium alloy tube.

BACKGROUND OF THE INVENTION

Commercial light water reactor fuel is composed of uranium dioxide pellets in a sheath or cladding of Zircaloy. In boiling water reactors, the cladding is made of Zircaloy-2 alloy; in pressurized water reactors, which operate with an overpressure of hydrogen, the fuel cladding is almost invariably made of Zircaloy-4. Such fuel is subject to a persistent failure mechanism known as fuel pellet-cladding interaction (PCI), which occurs on sudden increases of fuel rod power after sustained operation at a lower power. The PCI mechanism is believed to involve the simultaneous effects of stress on the cladding imposed by expansion of the pellet and the release of fission products, some of which act as stress corrosion cracking agents.

The general structure of a nuclear fuel bundle assembly 10 for a boiling water nuclear reactor is shown in FIG. 1. The fuel bundle assembly consists of a tubular flow channel 11 of generally square cross section provided at its upper end with a lifting bale 12 and at its lower end with a nose piece (not shown). The upper end of channel 11 has an opening 13. The lower end of the nose piece is provided with coolant flow inlet openings (not shown). A plurality of fuel rods 14 are arranged in parallel inside the fuel channel 11. The top end of each fuel rod is held by an upper tie plate 15 and the bottom end of each fuel rod is held and supported by a lower tie plate (not shown). During reactor operation, recirculating liquid coolant, e.g., water, enters through the openings in the lower end of the nose piece, flows upwardly through the spaces between fuel rods 14 and discharges at upper outlet 13.

One conventional type of fuel rod has a circular cylindrical housing 17, i.e., cladding, made of corrosion-resistant metal, e.g., zirconium alloy. The nuclear fuel is housed in cladding 17 in the form of a column of stacked pellets 16 made of fissionable and/or fertile material. Each fuel pellet is a circular cylinder having planar end faces disposed perpendicular to the cylinder axis. The pellets are stacked with end faces in abutment. A preferred fuel is uranium dioxide or a mixture comprising uranium dioxide and plutonium dioxide.

The cladding 17 is sealed at both ends by means of end plugs 18, only one of which is shown in FIG. 1. The end plugs are also made of zirconium alloy. Each end plug has a stud 19 which fits into a corresponding aperture in one of the tie plates to facilitate mounting of the fuel rod in the fuel bundle assembly.

The fuel column has a height which is less than the height of the cladding, so that a void space or plenum is provided at the upper end of the upright fuel rod. A standoff element 25 comprising a U-shaped standoff wire welded to a wafer-shaped base is installed in the plenum atop the topmost fuel pellet. Standoff element 25 supports a getter 23 at a predetermined height above the fuel column. A coiled compression spring 21 installed in the plenum serves to maintain the position of the fuel pellets during handling and transportation of the fuel rods by biasing the fuel pellets toward the plugged end adjacent to the fuel column.

The cladding 17 serves two primary purposes: first, the cladding prevents contact and chemical reaction between the nuclear fuel and the coolant/moderator; and second, the cladding prevents the radioactive fission products, some of which are gases, from being released from the fuel rod into the coolant/moderator. Failure of the cladding, due to build-up of gas pressure or any other reason, could result in contamination of the coolant/moderator and associated systems by radioactive long-lived products to a degree which would interfere with plant operation. Common cladding materials are stainless steel, aluminum and its alloys, zirconium and its alloys, niobium (columbium), certain magnesium alloys and others.

Problems have been encountered in the manufacture and in the operation of nuclear fuel elements which employ certain metals and alloys as the clad material due to mechanical or chemical reactions occurring with these cladding materials under certain circumstances. Zirconium and its alloys, under normal circumstances, are excellent nuclear fuel claddings since they have low neutron absorption cross sections and at temperatures below about 750° F. (about 398° C.) are strong, ductile, extremely stable and nonreactive in the presence of demineralized water or steam, which are commonly used as reactor coolants and moderators.

However, fuel element performance has revealed a problem with brittle splitting of the cladding due to the combined interactions between the nuclear fuel, the cladding and the fission products produced during nuclear fission reactions. This undesirable performance is due to localized mechanical stresses on the fuel cladding resulting from differential expansion and friction between the fuel and the cladding. Fission products are created in the nuclear fuel by the fission chain reaction during operation of a nuclear reactor, and these fission products are released from the nuclear fuel and are present at the cladding surface. These localized stresses and strains in the presence of specific fission products, such as iodine and cadmium, are capable of producing cladding failures by phenomena known as stress corrosion cracking or liquid metal embrittlement.

Within the confines of a sealed fuel element, hydrogen gas can be generated by the slow reaction between the cladding and residual water inside the cladding, and this hydrogen gas may build up to levels which, under certain conditions, can result in localized hydriding of the cladding, with concurrent localized deterioration in the mechanical properties of the cladding. The cladding may also be adversely affected by such gases as oxygen, nitrogen, carbon monoxide and carbon dioxide over a wide range of temperatures.

The zirconium cladding of a nuclear fuel element is exposed to one or more of the aforementioned gases and fission products during irradiation in a nuclear reactor. Sintered refractory and ceramic compositions, such as uranium dioxide and other compositions used as nuclear fuel, have been known to release measurable quantities of the aforementioned gases upon heating, such as during fuel element manufacture, and further release fission products during nuclear fission chain reactions. Particulate refractory and ceramic compositions, such as uranium dioxide powder and other powders used as nuclear fuel, have been known to release even larger quantities of the aforementioned gases during irradiation. These released gases are capable of reacting with the zirconium cladding containing the nuclear fuel.

In light of the foregoing, it is desirable to minimize attack of the cladding from water, water vapor and gases reactive with the cladding from inside the fuel element. One solution is to incorporate in the nuclear fuel element a composite cladding comprised of a metal barrier of moderate-purity zirconium (such as sponge zirconium) metallurgically bonded on the inside surface of a zirconium alloy tube. The composite cladding encloses the nuclear fuel material, leaving a gap between the fuel and the cladding. The metal barrier shields the alloy tube from the nuclear fuel and from fission products and gases. Because of its purity, the liner remains soft during irradiation and minimizes localized strain inside the nuclear fuel element. This protects the alloy tube from stress corrosion cracking or liquid metal embrittlement.

Such a composite cladding is disclosed in U.S. Pat. No. 4,200,492 to Armijo et al. As shown in FIG. 2 herein, nuclear fuel pellets 16 are surrounded by a composite cladding 17, conventionally referred to as "zirconium-liner barrier fuel cladding", forming a gap 24 therebetween. The composite cladding comprises a zirconium alloy tube 20, which in a preferred embodiment of this invention is made of Zircaloy-2. The alloy tube has metallurgically bonded on the inside surface thereof a metal barrier 22 which forms a shield that resists pellet-cladding interaction. The metal barrier forms about 1% to about 30% of the thickness of the cladding and comprises a low-neutron-absorption material, namely moderate-purity zirconium (such as sponge zirconium). The metal barrier 22 protects the alloy tube portion of the cladding from contact and reaction with gases and fission products and prevents the occurrence of localized stress and strain.

The content of the metal barrier of moderate-purity zirconium is important and serves to impart special properties to the metal barrier. Preferably, there is less than 4200 ppm (by weight) impurities in the material of the metal barrier. Of these impurities, oxygen is kept within the range of about 200 to about 1200 ppm. All other impurities are within the normal range for commercial, reactor-grade sponge zirconium: Al≦5 ppm; B≦4 ppm; Cd≦4 ppm; C≦270 ppm; Cr≦200 ppm; Co≦20 ppm; Cu≦50 ppm; Hf≦100 ppm; H≦25 ppm; Fe≦1500 ppm; Mg≦20 ppm; Mn≦50 ppm; Mo≦50 ppm; Ni≦70 ppm; Nb≦100 ppm; N≦80 ppm; Si≦120 ppm; Sn≦50 ppm; W ≦100 ppm; Ti≦50 ppm; and U≦3.5 ppm.

In accordance with the teaching of Armijo et al., the composite cladding has the metal barrier bonded to the substrate in a strong bond. Metallographic examination shows that there is sufficient cross diffusion between the materials of the substrate and the metal barrier to form a bond, but no cross diffusion to any extent away from the area of the bond.

These Zr-barrier cladding tubes are manufactured by coextrusion at elevated temperature to form a composite tube shell of Zircaloy with a liner of zirconium, followed by coreduction in a pilger mill in several passes with intermediate recrystallization anneals. As a result of the high-temperature extrusion and then the successive cold work and annealing, the zirconium has a grain size larger than that of the Zircaloy because recrystallization and grain growth occur more rapidly and at a lower temperature in the zirconium than in the Zircaloy. The recrystallization crosses the zirconium-Zircaloy interface and eliminates any physical boundary between them. The interface is discernible solely by a change in chemical composition from that of zirconium to that of Zircaloy. By virtue of the atomic continuity across the compositional interface, the heat generated in the fuel flows through the zirconium liner and into the Zircaloy unimpeded by any physical boundary or interface. Furthermore, the strength of the interface is no less than that of the zirconium liner itself.

The sponge zirconium metal forming the metal barrier in the composite cladding is highly resistant to radiation hardening. This enables the metal barrier to maintain desirable structural properties after prolonged irradiation, such as yield strength and hardness, at levels considerably lower than those of conventional zirconium alloys. In effect, the metal barrier does not harden as much as conventional zirconium alloys when subjected to irradiation. This property, together with its initially low yield strength, enables the metal barrier to deform plastically and relieve pellet-induced stresses in the fuel element during power transients, i.e., the Zr-barrier maintains the stress at a level so low that cracks cannot propagate through the cladding.

Pellet-induced stresses in the fuel element can be caused, for example, by swelling of the fuel pellets at cladding operating temperatures (300°–350° C.), so that the pellet comes into contact with the cladding. A metal barrier of sponge zirconium having a preferred thickness of 10% of the cladding thickness provides stress reduction and a barrier effect sufficient to prevent PCI failures in the composite cladding.

Suitable zirconium alloys for use as the alloy tubes include Zircaloy-2 and Zircaloy-4. Zircaloy-2 typically comprises 1.4–1.6 wt. % tin, 0.14–0.16 wt. % iron, 0.10–0.12 wt. % chromium and 0.05 wt. % nickel. Zircaloy-4 contains relatively less nickel and more iron. Sponge zirconium typically comprises <0.0010 wt. % tin, 0.030–0.050 wt. % iron, 0.0050–0.0070 wt. % chromium and <0.0035 wt. % nickel.

The Armijo et al. patent further discloses several methods for fabricating zirconium-liner barrier fuel cladding. In accordance with one method, a hollow collar of sponge zirconium is inserted into a hollow billet of zirconium alloy. Then the assembly is subjected to explosive bonding of the collar to the billet. The composite is extruded at an elevated temperature of about 1000° F. (538° C.) to about 1400° F. (750° C.) using conventional tube shell extrusion techniques. The extruded composite is then subjected to a process involving conventional tube reduction until the desired size of cladding is achieved.

In accordance with another method, a hollow collar of sponge zirconium is inserted into a hollow billet of zirconium alloy. Then the assembly is heated, e.g., to 1400° F. (750° C.) for about 8 hr to produce diffusion bonding between the collar and the billet. The composite is then extruded using conventional tube shell extrusion techniques and the extruded composite is subjected to a process involving conventional tube reduction until the desired cladding size is achieved.

In summary, zirconium-liner barrier fuel cladding promotes a relatively long operating life for a nuclear fuel element by resisting chemical interaction between the fuel pellets and the zirconium alloy tube; by minimizing localized stress, stress corrosion and localized strain on the zirconium alloy tube; and by reducing the probability of a splitting failure occurring in the zirconium alloy tube. The zirconium-liner barrier fuel cladding further prevents expansion (or swelling) of the nuclear fuel into direct contact with the zirconium alloy tube, and this in turn prevents localized stress on the zirconium alloy tube, initiation or acceleration of stress corrosion of the zirconium alloy tube and bonding of the nuclear fuel to the zirconium alloy tube.

One drawback is that in the event the zirconium-liner barrier fuel cladding develops a breach allowing water and/or steam to enter the fuel rod, the unalloyed sponge zirconium tends to oxidize rapidly. However, a remarkable increase in corrosion resistance of the zirconium can be obtained by annealing the entire section of tube at a temperature which allows alloying elements, rotably Fe and Ni, to diffuse from the Zircaloy to the free surface of the sponge zirconium liner. This was reported by Cheng and Adamson in an article entitled "Mechanistic Studies of Zircaloy Nodular Corrosion", Zirconium in the Nuclear Industry: Seventh International Symposium, ASTM STP 939 (1987), pp. 387–416. Annealing was carried in a vacuum furnace at a temperature of 900° C. for 1 to 120 minutes.

SUMMARY OF THE INVENTION

The present invention improves upon the prior art method by reducing the undesirable tendency for the sponge zirconium liner to oxidize rapidly. The invention is a process for fabricating a zirconium-liner barrier fuel having improved corrosion resistance in steam or water environments. The improved corrosion resistance of the liner is accomplished by suitable heat treatment of the Zircaloy-zirconium composite cladding to allow diffusion of alloying elements, notably Fe and Ni, from the Zircaloy into the zirconium, in particular, to the inner surface of the zirconium liner.

DETAILED DESCRIPTION OF THE PREFERRED EMBODIMENT

Figure 1:
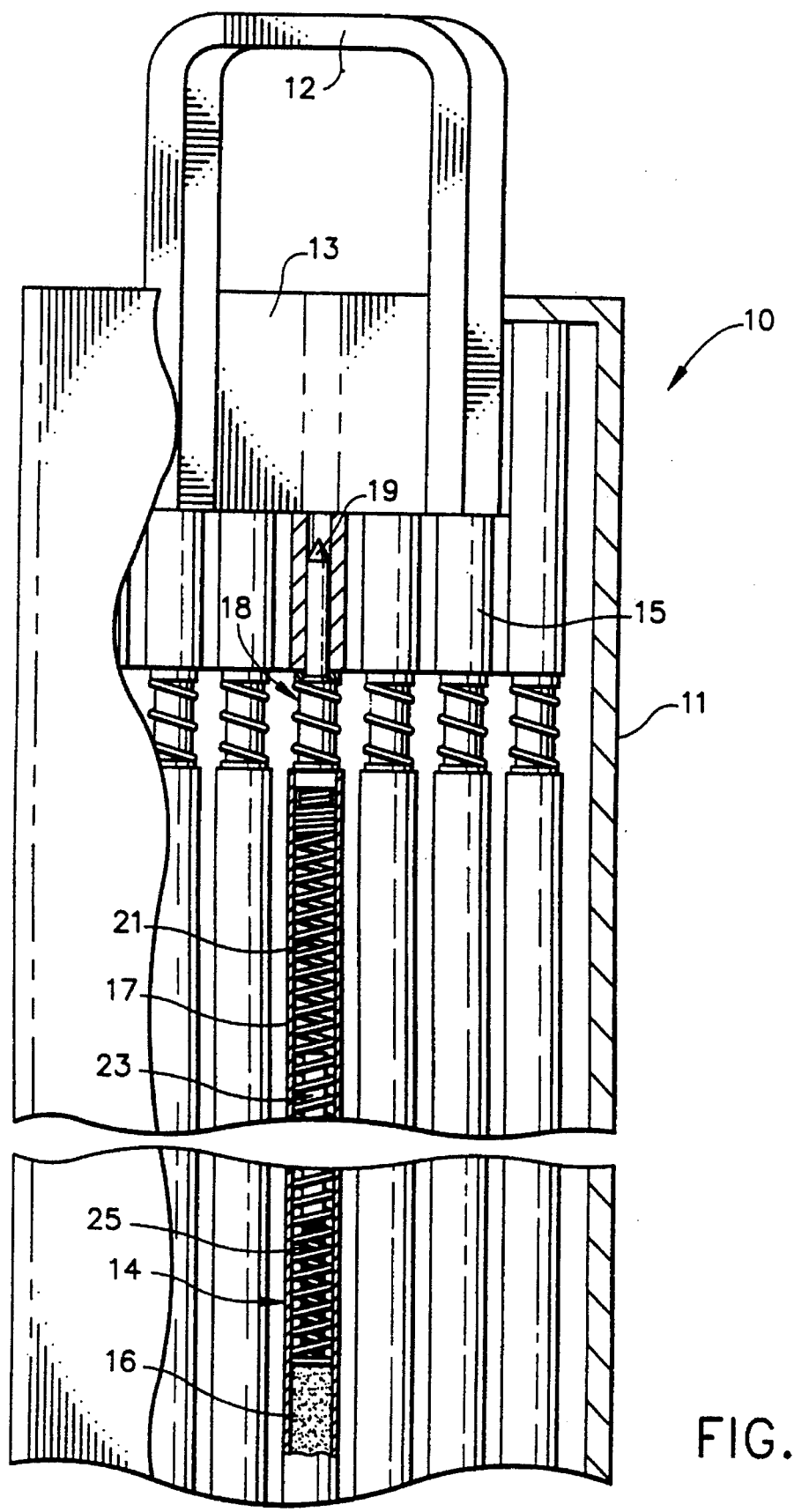
FIG. 1 is a partial sectional view of a nuclear fuel bundle assembly containing conventional nuclear fuel rods, one of which is shown partially sectioned.
Figure 2:
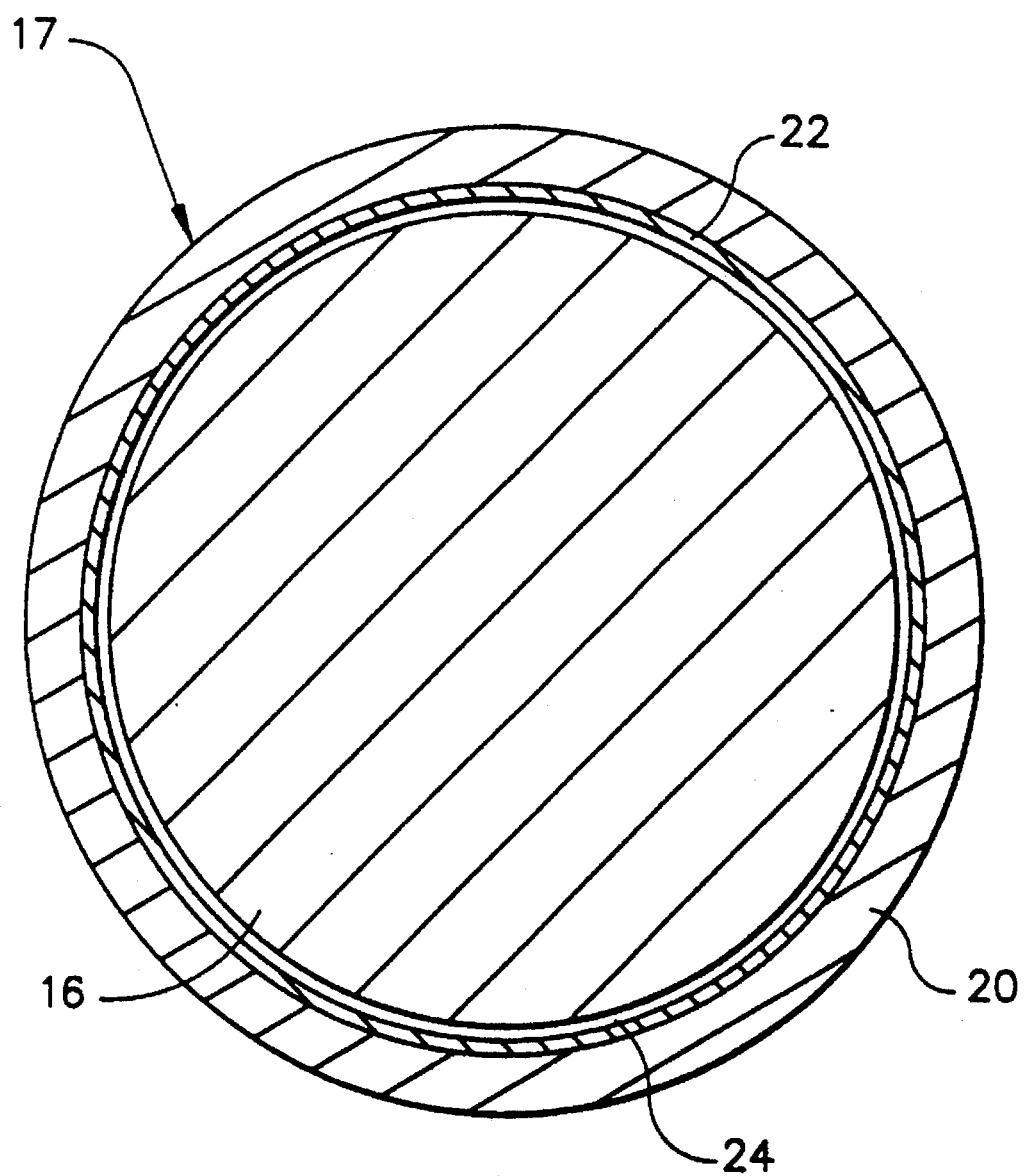
FIG. 2 is a cross-sectional view of the nuclear fuel rod shown in FIG. 1.

The invention is a process for improving the corrosion resistance of the zirconium liner of zirconium liner barrier fuel cladding or of any dilute zirconium alloy used as a liner in conjunction with tubes made of Zircaloy-2, Zircaloy-4 or other zirconium alloys containing Fe and Ni. The process includes a vacuum heat treatment of the integral barrier fuel cladding at temperatures in the range of 800°–1020° C. (preferably near 900° C.) for times between 1 minute and 20 hr. The exact time and temperature used depends on the fabrication stage at which the heat treatment occurs. In the normal practice for production of barrier fuel cladding, any one of at least four stages would be appropriate for application of the aforementioned vacuum heat treatment: (1) at the final tubing size; (2) at the stage one pass before final; (3) at the stage two passes before final; or (4) in the tube shell (three or four passes before final).

Since the invention depends on diffusion of Fe and/or Ni through the Zircaloy and zirconium metals, the key variables are time, temperature and barrier thickness. At any given temperature the required diffusion time depends directly on the zirconium barrier thickness. For instance, it is known that at the final tubing size with a 3-mil-thick zirconium liner, a proper treatment is heating to 900° C. for 3 to 60 minutes. The unique aspect of the instant invention is that heat treatment need not occur at the final tube size; in fact, any of the common stages of fabrication mentioned above will suffice.

A fabrication sequence in accordance with a preferred embodiment of the invention is as follows:

(1) tube reduction of the tube shell (≈70% cold working followed by recrystallization annealing at 576° C. for 2 hr);

(2) vacuum heat treatment at 925° C. for 15 hr;

(3) induction heat treatment of the outer layer of the Zircaloy while cooling the inner surface of the tube with flowing water (the outer portion of the Zircaloy tube is heated to a temperature in the range of 850°–1020° C. followed by rapid quenching, while the inner zirconium liner remains at a temperature below 400° C.);

(4) tube reduction of the intermediate tube cold working followed by recrystallization annealing at 576° C. for 2 hr); and (5) tube reduction to tubing final size (≈70% cold working followed by recrystallization annealing at 576° C. for 2 hr or stress relief annealing at about 485° C. for 2 hr).

As a result of this treatment sequence, Fe and Ni will diffuse from the Zircaloy tube to the inner surface of the sponge zirconium liner. At this final stage both the outer Zircaloy surface and the inner zirconium layer will have adequate corrosion resistance. Since the inner zirconium liner composition has only slightly enhanced concentrations of Fe and Ni (i.e., estimated concentrations in the range of 100 to 200 ppm by weight at the inner surface), and since the strengthening elements 0 and Sn do not appreciably diffuse into the zirconium, the ability of the barrier to resist pellet-cladding interaction will not be degraded.

Standard Zircaloy-2 tube shells with sponge zirconium liners have been used for experiments. The cold working effects produced by conventional pilgering of the tube shell were simulated in the laboratory by slitting open the tube shell and cold rolling the Zircaloy-2 into sheet. This simulated tube reduction fabrication produced material similar to that produced after one, two and three tube reduction passes. After three passes the material was similar to barrier tubing in the final size. Nine coupons were annealed at 925° C.: three for 0.5 hr; three for 3 hr; and three for 7 hr. Corrosion tests were conducted in aggressive 410°/520° C. steam, i.e., the coupons were placed in an autoclave, ramped to 400° C. for 4 hr and then the temperature in the autoclave was increased to 520° C. and held there for 16 hr. the test results showed that a thin corrosion film of black zirconium oxide, rather than a thick corrosion film of white zirconium oxide, was produced on the liner surface of at least one coupon from each stage. In particular, the coupons subjected to 7-hr annealing after one pass; 3-hr and 7-hr annealing after two passes; and ½-hr, 3-hr and 7-hr annealing after three passes all produced the desired black oxide film when exposed to a corrosive environment, indicating improved corrosion resistance.

A coupon which had been heat-treated at 925° C. for 15 hr after one pass was subsequently given simulated tube reduction to final tube size (i.e., two cycles of 70% cold work plus 576° C. recrystallization anneal) and then corrosion tested. Although the corrosion resistance was not as good as in the as-heat-treated (as-diffusion-annealed) condition, the corrosion resistance was significantly higher than had no diffusion anneal been performed.

We claim:

1. Barrier fuel cladding made by a process comprising the following steps:

tube reduction of a tube shell consisting essentially of a zirconium liner metallurgically bonded to a zirconium alloy tube interior surface, said step of tube reduction being accomplished by a step of cold working followed by recrystallization annealing to produce a first intermediate tube;

heat treatment of said first intermediate tube;

one or more steps of tube reduction of said heat-treated first intermediate tube by cold working followed by recrystallization annealing or stress relief annealing to produce said barrier fuel cladding, wherein said heat treatment comprises vacuum heat treating said first intermediate tube at a temperature of about 900° to 1020° C. and for a duration sufficient to cause the diffusion of Fe and/or Ni atoms from said zirconium alloy tube to the inner surface of said liner without causing appreciable diffusion of the elements oxygen and tin into said liner, and wherein said Fe and Ni atoms are present at said inner surface of said liner at concentrations of between about 100 and 200 ppm by weight.

2. The barrier fuel cladding as defined in claim 1, wherein said liner is composed of sponge zirconium.

3. The barrier fuel cladding as defined in claim 1, wherein said heat treatment further comprises induction heat treating an outer layer of said zirconium alloy tube to a temperature in range of 850° to 1020° C. while cooling an inner surface of said zirconium liner with flowing water and then rapid quenching of said first intermediate tube.

4. The barrier fuel cladding as defined in claim 3, wherein said liner surface of said zirconium liner is maintained at a temperature less than 400° C. during said cooling.

* * * * *